Figure 1:
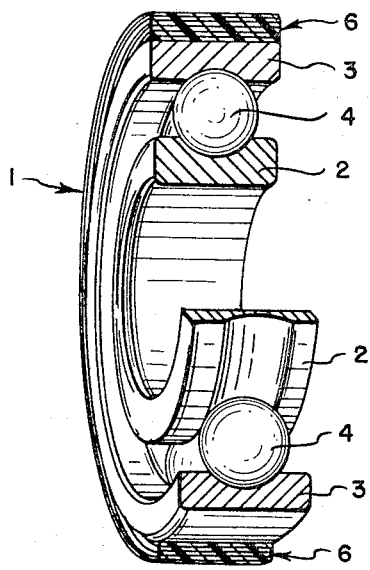

Jan. 23, 1968   H. M. DARDANI ET AL   3,365,256
INTERFERENCE CONNECTION
Filed July 2, 1964

INVENTORS
HUMBERT M. DARDANI
JOHN R. SLOAN
BY
Pennie, Edmonds, Morton, Taylor & Adams
ATTORNEYS United States Patent Office 3,365,256
Patented Jan. 23, 1968

3,365,256
INTERFERENCE CONNECTION
Humbert M. Dardani and John R. Sloan, Keene, N.H., assignors to MPB, a corporation of New Hampshire
Filed July 2, 1964, Ser. No. 379,939
8 Claims. (Cl. 308—236)

The present invention relates to an interference connection between associated male and female support members and more particularly to the formation of an interference fit in which the connected parts are made without maintaining close tolerances and where any space, regular or irregular, that is present between the parts, such as that caused by the loose tolerances, is automatically taken up by a shearable material adhered to one of the members.

Many precision devices including certain mechanical, electro-mechanical and optical-mechanical mechanisms as well as many household appliances require that a closely controlled interference fit be maintained between various elements. For example, the proper mounting of bearings in such mechanisms presently require that the mating surfaces of the bearing assembly and the housing be precisely machined within close tolerances so as to produce cooperating surfaces that will frictionally hold the assembly within the surrounding housing under various types of loading. In many instances, however, the cost of preparing such surfaces in this precise manner is equal to the value of the part which is being mounted.

Even where the cost of machining is not considered to be of paramount importance in relation to the total cost of the product being made, precision ground interference fittings are subject to wear during use and frequently become so loose that replacement is required. For instance, the driving shaft of a motor when rotatably mounted in a bearing member which is, in turn, frictionally secured in the housing of the motor with a closely controlled interference fit, will, when subjected to repeated loading, and particularly unbalanced loading, cause the interference fit between the bearing and the housing to loosen. Once this has occurred, it becomes necessary to replace the bearing support in order to prevent serious damage to the motor.

In accordance with the teachings of the present invention, a uniformly controlled interference fit between mating male and female parts is effected with a substantial reduction in the cost of manufacture by eliminating the need for the expensive precision grinding of the mating surfaces normally required to assure that they are precisely matched.

In addition to providing an economic reduction in manufacturing costs of these connections, the particular combination of materials used in the interference fit of the present invention effectively inhibits the formation of ferric oxide or friction oxidation between stationary metal parts that might normally be caused by dynamic loading of these parts.

With the present invention, the usual tolerances between the parts may be relaxed and the associated male and female parts may even be irregularly surfaced or contoured and still form an assembled tight interference fit that is superior in many respects to the fit produced between precision ground parts.

The interference connection of the present invention may not only be used in the original manufacturing of devices requiring this type of connection, but may also be used in devices where the original precision connection between such male and female parts has become loose and deformed by the loading of the parts during use.

Generally, the interference fit of the present invention is provided by adhering a film of shearable, substantially non-elastic material to one of the parts with the thickness of the film being at least equal to the maximum spacing or tolerance between the parts whereby upon assembly, the film will completely fill the spacing between the parts with any excess film being sheared off during the assembly operation. The material used for the film coating is one which will assure that the compressive forces developed in the film and on the mating surfaces when the assembly is subjected to loading will be substantially uniform. Also, the properties of the film are such that the shearing of excess material from between the parts during assembly will be effected independently of any layer formation of the film whereby the thickness of the film may accurately follow the spacing between the parts.

Figure 2:
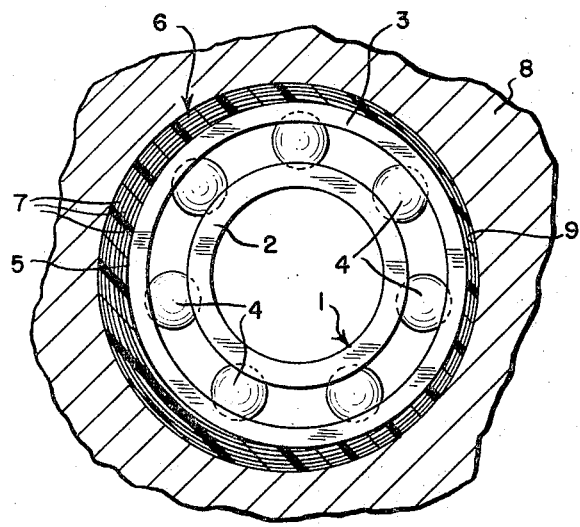
Figure 3:
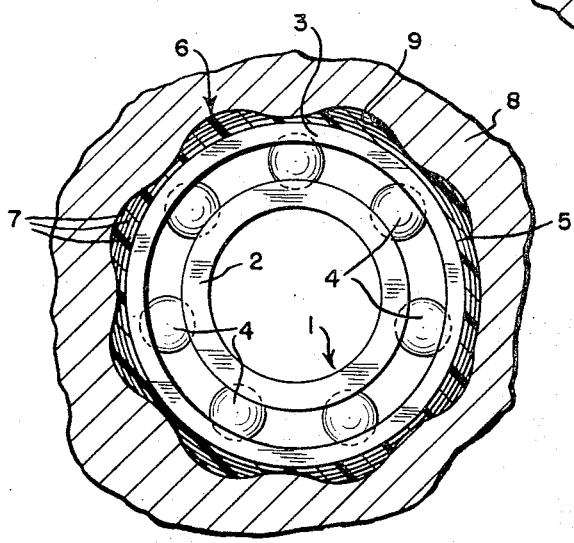

A fuller understanding of the present invention will be obtained upon an examination of the following description and accompanying drawings of which:

FIG. 1 is a perspective cross-sectional view of a bearing assembly constructed in accordance with the present invention, FIG. 2 is a cross-sectional view of a bearing assembly mounted within a housing, and FIG. 3 is a cross-sectional view of a bearing mounted within an irregulaly shaped opening.

As shown in the drawings, a conventional ball bearing 1 comprising an inner race 2, an outer race 3, and intermediate balls 4 is provided on the outer periphery 5 of the outer race with a film of material 6 that completely covers the surface 5 with a substantially uniform thickness of material.

In accordance with the present invention, the coating material employed is one which will produce a shearable, substantially non-elastic film or coating when applied to the bearing. A mixture of molybdenum disulfide with an epoxy bonding resin in a volatile carrier has been found suitable. An example of such a material is Molykote X106 manufactured by the Alpha-Molykote Corporation. As shown in FIG. 1, the coating material is applied to the outer surface 5 of the race 3 in a layer formation. Successive layers 7 are applied and heat cured until the thickness of the coating has reached the maximum spacing that will be encountered between the parts in the assembled interference connection. Since in accordance with the present invention, it is desirable to eliminate the close tolerances usually present in this type of connection, the layers 7 are built up until a total thickness of about .0025 inch is obtained. The molybdenum disulfide and epoxy bonding agent when applied to the bearing produces a homogenous surface coating or film that is not only substantially non-elastic but a layered coating that is capable of shearing non-uniformly around the periphery of the bearing when pressed into a housing opening without any slip-plane or fault line separation at the layer boundaries. This is an important feature of the present invention since it permits the coating to completely fill the space between the parts of the assembled interference connection regardless of any irregularities in the opening or misalignment between the parts. Also, the molybdenum disulfide with the epoxy resin produces a substantially uniform film on the metal surface of the bearing and produces successive layers which are also of uniform thickness whereby the build-up of material can be controlled as desired to produce a coated surface of substantially uniform thickness.

After the outer ring of the bearing has been coated to the required thickness, the treated bearing is then ready for insertion into the cooperating female member. As shown in FIG. 2, the female member comprises a housing 8 which may be a stationary part of a suitable motor, not shown. The opening in the housing 8 as shown in FIG. 2 defines a substantially regular surface 9. In actual practice, the opening will usually be approximately circular as shown in FIG. 2 although not machined or ground to any precise accuracy. In pressing the coated bearing shown in FIG. 1 into the opening shown in FIG. 2, the film in excess of the spacing between the outer race and the housing wall at the various positions around the bearing will be sheared off as the coated bearing assembly adapts itself to the precise shape of the opening. And accordingly, even though the mounting of the bearing within the opening in the housing may not be precisely concentric, nevertheless a tight interference fit will be effected.

FIG. 3 shows a construction also within the teachings of the present invention where the housing 8 is provided with an irregularly shaped opening 9'. As with the construction of FIG. 2, the coating 6 of the bearing 1 will accommodate itself to the shape of the opening 9' to produce a tight interference fit, and with both of these constructions, it is only necessary that the parts be aligned to the extent that the maximum spacing between the parts at any point be no greater than the thickness of the coating at that point and to the extent that there is no direct contact between the bearing 1 and the housing 8. More specifically, the minimum spacing between the parts that is permissible with the interference fit of the present invention is that which will assure a continuous coating of film material between the members, and this, in turn, in dependent on the properties of the particular coating material employed. For example, with a coating of molybdenum disulfide and epoxy resin, the grain size of the particles from which the material is composed will determine the minimum coating thickness. If the thickness of this coating were permitted to become less than the grain size of the coating material, assembly of the parts would tend to shear the film completely off the bearing member and accordingly, even if there were some spacing between the assembled parts at all points around the bearing member, the assembly might have spaces between the two mating parts which are not completely filled with film material. This, in turn, would tend to permit flaking of the coating from the bearing member in adjacent areas. With the coating material of Molykote X106 which is one of extremely fine grain, the minimum thickness of the coating between the assembled parts is maintained at approximately .0003 inch which is in the order of two or three times the size of the grain in the coating material.

As indicated above, the material used in coating the bearing is such that a substantially non-elastic film separates all the parts of the assembled interference fit. Due to this, the compressive forces that are developed on the film and on the bearing outer race of the assembled connection are uniform forces and are independent of the film thickness in any particular area. Accordingly, varying forces of containment on the bearing outer ring usually encountered with an irregularly shaped housing are not encountered with the construction of the present invention.

Furthermore, the use of the molybdenum disulfide plus the epoxy resin bonding agent provides a coating which is capable of withstanding shear in the direction around the bearing outside surface which would normally tend to separate the coating from the bearing outer ring when, for example, any rotative force were applied to the bearing. Therefore, the interference fit of the present invention is particularly suited for withstanding vibrations induced by both misalignment of the parts and by unbalanced loading of the bearing.

Dynamic tests conducted with bearings fitted to housing members in accordance with the teachings of the present inventoin show that the principle of a shearable coating can be applied to many members in rotating and reciprocating equipment to reduce the requirement for extremely close tolerances on shaft and housing fits. For purposes of illustration, two of these tests are described below.

TEST #1

In this test, a one-third horsepower motor of conventional construction was run in service to the point where significant wear had developed in one of the motor end bells, greatly increasing the looseness of the motor bearing in its normal support. The bearing was approximately .0025 inch loose in the deformed end bell bore when removed. A coating of molybdenum disulfide plus epoxy resin bonding agent was applied to the outer periphery of the bearing outer ring to a total film thickness of .005 inch and this bearing was then remounted into the deformed end bell and the motor put in operation driving a circulating water pump. This reconditioned motor has run twenty-four hours a day for more than five months and throughout this time has produced uniform pump action with no noticeable vibration.

TEST #2

In this test, a standard fractional horsepower motor, using the same size bearing as was used in Test #1, was checked and all parts of the motor were found to be dimensionally acceptable. The outside diameter of one bearing was ground undersize by reducing its outside diameter by .003". A molybdenum disulfide plus epoxy bonding layer was added to increase the outside diameter of the undersize bearing by .006" and the coated bearing was then press fitted into the standard motor housing. A small steel flywheel was purposely unbalanced and fitted to the motor shaft. The motor ran for more than 400 hours with a rotating unbalanced load, caused by the flywheel, of more than seven pounds. At the end of this running time, the motor was disassembled and no change in film thickness was observed. The film had not broken down under the pounding caused by the unbalanced dynamic load. Motor performance was uniform. After examination, the coated bearing was refitted into the same housing, the motor was reassembled and the test restarted; and the performance of the motor was found to be the same as before.

Although the above tests were conducted with an interference fit between the outer race of a ball-bearing and an encircling housing, it is apparent that the teachings of the present invention can be applied equally as well to an interference fit between an inner race member encircling a shaft or to any similar male and female connection. Also, it is to be understood that other coating materials besides molybdenum disulfide and epoxy resin can be used for coating one of the parts of the interference connection as long as the material possesses the properties set out above; and that various other changes can be made without departing from the scope of the invention as set forth in the following claims.

We claim:
1. A bearing assembly comprising:
 (a) an outer race member defining an outer mounting surface,
 (b) an inner race member defining an inner mounting surface rotatably secured therein about an axis extending through said assembly, and
 (c) a substantially non-elastic, shearable coating material of predetermined thickness adhered to and completely covering at least one of said mounting surfaces and having an outer exposed surface facing away from the underlying mounting surface, said coating material:
  (1) comprising a plurality of substantially uniform layers of material,
  (2) having the physical characteristic of being shearable in a direction along said axis independently of the layer formation when said coating is interpositioned between one of said mounting surfaces and a support, and

(3) being capable of forming an interference connection with one of said mounting surfaces and said support.

2. An interference connection comprising:
(a) a female support member having an inner mounting surface,
(b) a male support member having an outer mounting surface positioned within said female member and spaced therefrom to define an open area, and
(c) a substantially non-elastic, shearable coating material adhered to one of said mounting surfaces and completely filling said open area and frictionally engaging the opposed mounting surface, said coating material comprising:
   (1) a plurality of substantially uniform layers of material, and
   (2) being shearable in a direction along the longitudinal axis of said male support member independently of the layer formation.

3. An interference connection according to claim 2 wherein:
(a) said coating material is comprised of particles of a predetermined size, and
(b) the minimum thickness of said coating material at all points between said mounting surfaces is greater than said predetermined size.

4. An interference connection comprising:
(a) a female support member having an inner mounting surface;
(b) a male support member having an outer mounting surface positioned within said female member and spaced therefrom to define an open area; and
(c) a substantially non-elastic shearable coating material of particles of predetermined size, including molybdenum disulfide and epoxy resin as a bonding agent, adhered to one of said mounting surfaces and completely filling said open area with the minimum thickness of said coating material at all points between said mounting surfaces being greater than said predetermined size, said coating material comprising:
   (1) a plurality of substantially uniform layers of material, and
   (2) being shearable along the direction of the longitudinal axis of said male support member independently of the layer formation.

5. An interference connection according to claim 4 wherein:
(a) said male support member comprises
   (i) an outer race member defining said outer mounting surface, and
   (ii) an inner race member rotatably secured therein.

6. An interference connection according to claim 5 wherein:
(a) said male support member is mounted eccentrically within said female support member.

7. An interference connection according to claim 5 wherein:
(a) said female member defines an inner mounting surface of irregular contour.

8. A bearing assembly comprising:
(a) an outer race member defining an outer mounting surface;
(b) an inner race member defining an inner mounting surface rotatably secured therein about an axis extending through said assembly; and
(c) a substantially non-elastic shearable coating material, including molybdenum disulfide and epoxy resin as a bonding agent, of predetermined thickness adhered to and completely covering at least one of said mounting surfaces.

References Cited

UNITED STATES PATENTS

| | | | |
|---|---|---|---|
| 1,152,681 | 9/1915 | Wieselgreen | 308—184 |
| 1,797,855 | 3/1931 | Conlan | 156—294 |
| 2,700,581 | 1/1955 | Migny | 308—238 |
| 3,208,880 | 9/1965 | Stenert et al. | 308—236 |

MARTIN P. SCHWADRON, *Primary Examiner.*

FRANK SUSKO, *Assistant Examiner.*